United States Patent Office 3,197,451
Patented July 27, 1965

3,197,451
COPOLYMERS OF FLUORINATED NITROSO-ALKANES AND TRIFLUOROETHYLENE
Robert Neville Haszeldine, Manchester, England, and Christopher J. Willis, Vancouver, British Columbia, Canada, assignors to National Research Development Corporation, London, England, a British corporation
No Drawing. Filed July 11, 1961, Ser. No. 123,123
10 Claims. (Cl. 260—92.1)

The present invention relates to polymeric organic compounds containing fluorine, nitrogen and oxygen, and to methods for the preparation thereof. This application is a continuation-in-part of application Serial No. 769,301, filed on October 24, 1958, now abandoned.

It is known that polymers can be prepared by the reaction of a fluorinated nitrosoalkane with tetrafluoroethylene (J. Chem. Soc. 1955, pages 1881 to 1889, and French Patent No. 1,159,935). Such compounds consist of polymeric chains which have repeating units of structure

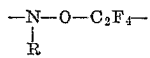

when R represents a perfluorinated alkyl group, recurring continuously throughout their length. Such polymers possess rubbery properties.

This invention provides polymers consisting essentially of polymer chains having repeating units of the basic —N—O—C—C— type which have been found to have highly useful properties which are different from those of the above mentioned polymers.

According to the present invention, there is provided a polymer consisting essentially of polymeric chains of structure

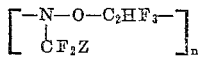

in which Z represents a group selected from the groups consisting of a fluorine atom, a chlorine atom, and a halogeno-alkyl group selected from the group consisting of a fluoro-alkyl group and a fluoro- and chloro-alkyl group, and $n$ represents an integer from 3 to 5,000, said polymer having a molecular weight not greater than 2,000,000. The molecular weight limitation applies to the molecular weight when calculated by the viscosity method using a fluoro-carbon solvent.

A particular feature of the new polymers is that the polymeric chains can be cross-linked by treating the polymer with a source of free radicals. The free radicals extract hydrogen atoms from the polymeric chains, thus leaving polymer free radicals which intercombine to form the cross-linked polymer. It will be appreciated that the free radical source plays no part in this cross-linking. Convenient free radical sources are dibenzoyl peroxide, azo compounds, hydroperoxides and organic peroxides, and dibenzoyl peroxide has been found to be especially suitable. The degree of cross-linking can be varied by variation of the temperature at which the polymer is treated, the limit of treatment and the concentration of the free radical source. For instance treatment with 2% by weight of dibenzoyl chloride at about 100° C. for about 30 minutes has been found to considerably harden and toughen the polymers and render them insoluble in all common organic solvents.

In cases where Z represents a substituted alkyl group, said group preferably contains from 1 to 4 carbon atoms. In cases where the polymer is required to have maximum stability to heat, hydrolysis and chemical attack in general, Z preferably represents chlorine, fluorine or a perfluoro-alkyl group.

There is further provided by the invention a process for the manufacture of a polymer comprising the step of reacting trifluoroethylene with a fluorinated nitrosoalkane of structure $$Z\text{---}CF_2\text{---}NO$$

in which Z represents a group selected from the groups consisting of a fluorine atom, a chlorine atom, a fluorine-substituted alkyl group and a fluorine- and chlorine-substituted alkyl group, at a temperature in the range of about —40° C. to 150° C. and a pressure in the range of about 0.1 to 200 atmospheres.

Within the ranges mentioned above, the reaction is preferably performed in a temperature range of —25° to 30° C. and a pressure range of 1 to 10 atmospheres, and proceeds steadily at room temperatures and pressures. An increase in temperature accelerates the rate at which the components react, but a temperature of more than 50° C. (at pressures of 5 to 10 atmospheres) leads mainly to the formation of an oxazetidine

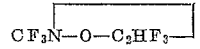

with a consequent decrease in the yield of polymer. The oxazetidine is more volatile than the polymer and can be removed by evaporation.

The ratio of reactants used is not critical but equimolar proportions are desirable. This leads to the formation of a co-polymer of higher molecular weight than is the case if a large excess of one of the reactants is employed. Nevertheless use of an excess of one or other of the reagents still results in a strict 1:1 polymer.

The reaction produces a 1:1 co-polymer according to the equation

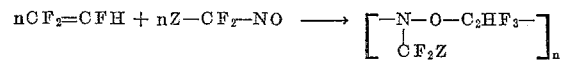

wherein Z and $n$ are as hereinbefore defined.

A repeating unit of structure

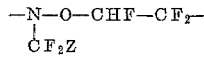

is believed to predominate.

The polymers of the present invention have been found to possess particularly useful properties. Thus, in their uncross-linked form, they are elastomers having high chemical resistance and thermal stability, particularly in cases where $n$ is at least 8, and are thus useful for gasket materials and as substitutes for rubber in aircrafts, rockets and the like in which durable products are required. They are also soluble in conventional solvents such as acetone, and so can be used in surface coatings, paints etc. for protection of metal, wood, textiles and the like. Moreover, quite unpredictably, it has been found that they can be readily cross linked to varying degrees without the loss of fluorine, which is in contrast to the co-polymers of tetrafluoroethylene and fluorinated nitrosoalkanes, which can only be cross-linked with loss of fluorine and consequent increased susceptibility to hydrolytic or thermal breakdown. This property of cross-linking enables polymers to be prepared varying from hard rubbers with good "snap" and retaining their solubility in organic solvents, to resins which are highly cross-linked and insoluble in organic solvents. These cross-linked resins are very resistant to chemical attack, and are thus useful in laminate mouldings, where high solvent resistance is required. They are also of use as albatory polymers.

Furthermore, the presence of hydrogen atoms in the polymeric chain makes it possible to attach additional substituents to the basic polymeric chain. Thus treatment of the polymers with sulphonyl chloride results in part replacement of hydrogen atoms by chlorosulphonyl groups. Thus the polymers of the invention may be used as synthetic intermediates. The hydrogen atoms in the polymeric chain can also be used as a site of attack for chemical dyeing so that coloured polymers can be obtained.

The following examples illustrate the invention:

*Example 1*

Equimolar proportions of the trifluoronitrosomethane (12 parts) and trifluoroethylene (10 parts) are condensed in vacuo into a Pyrex tube which is then sealed and allowed to warm up to about 20° C. so that the reaction proceeds under a pressure of about 8 atmospheres. The blue colour of the nitroso compound slowly fades and, after about 14 days, on the removal of the volatile products, an approximately 50% yield of a clear, colourless elastomer is obtained. Analysis of the elastomer obtained has shown it to be a 1:1 co-polymer of trifluoronitrosomethane and trifluoroethylene: Found: C, 19.8; H, 0.8; N, 7.0%; $C_3HNOF_6$ requires C, 19.8; H, 0.6; N, 7.7%.

When the polymer was dissolved in diethyl ketone and applied as a surface coating to wood, the wood then showed marked resistance to chemical attack by sulphuric acid, hydrochloric acid and potassium permanganate solution.

When the polymer was heated at 100° C. for 30 minutes with 2% by weight of dibenzoyl peroxide, the cross-link polymer was much harder and tougher, and was insoluble in ketone solvents and in all common organic solvents. Treatment of the polymer with concentrated nitric acid failed to cause chemical attack.

*Example 2*

Trifluoronitrosomethane (2.39 parts) and trifluoroethylene (1.98 parts) are kept at 70° C. in a sealed Pyrex tube at 5–10 atmospheres for 2 days. The co-polymer is formed in 8% yield and analysis has shown it to be a 1:1 co-polymer: Found: C, 19.8; H, 0.8; N, 7.9%; $C_3HNOF_6$ requires C, 19.9; H, 0.6; N, 7.7%. The oxazetidine

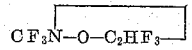

(found: C, 19.7; H, 0.8; N, 0.8%; required: C, 19.9; H, 0.6; N, 7.7%) is formed in 80% yield, and the weight balance is made up by recoverable starting materials.

*Example 3*

Trifluoroethylene was reacted with fluorinated nitroso-compounds as shown in the table below under the conditions used in Example 1. The results were as follows:

| Nitroso-compound | Olefin | 1:1-Co-polymer, percent yield and type |
|---|---|---|
| $CF_2ClNO$ | $CHF:CF_2$ | 40% Pale yellow, clear elastomer. |
| $C_3F_7NO$ | $CHF:CF_2$ | 70% Colourless, hard elastomer with very good snap. |
| $CF_2Cl.CF_2NO$ | $CHF:CF_2$ | 50% Slightly translucent elastomer. |
| $CHF_2.CF_2NO$ | $CHF:CF_2$ | 35% Viscous, clear, colourless oil. |

All of the polymers obtained were strict 1:1 co-polymers of trifluoroethylene and the nitroso-compound. Use of an excess of either reactant failed to change the composition of the polymer.

Similar reactions were carried out using the reaction conditions of Example 2, and similar polymers were obtained, but in smaller yield.

We claim:

1. A substantially 1:1 copolymer of trifluoroethylene and a fluorinated nitrosoalkane, said copolymer consisting essentially of structural units, connected in head to tail manner, of the formula

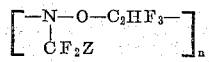

in which $n$ represents an integer from 3 to 5,000, and Z is selected from the group consisting of a fluorine atom, a chlorine atom, a fluoroalkyl radical having 1 to 4 carbon atoms and a fluorochloroalkyl radical having 1 to 4 carbon atoms.

2. The copolymer of claim 1 wherein Z is a fluorine atom.

3. The copolymer of claim 1 wherein Z is a chlorine atom.

4. The copolymer of claim 1 wherein Z is a perfluoroethyl group.

5. The copolymer of claim 1 wherein Z is a monochlorodifluoromethyl group.

6. The copolymer of claim 1 wherein Z is a difluoromethyl group.

7. A process for preparing a substantially 1:1 copolymer comprising reacting trifluoroethylene and a fluoronitrosoalkane represented by the structure $Z—CF_2—NO$, in which Z is selected from the group consisting of a fluorine atom, a chlorine atom, a fluoroalkyl radical having 1 to 4 carbon atoms and a fluorochloroalkyl radical having 1 to 4 carbon atoms, at a temperature in the range of about −40° to 150° C. and a pressure in the range of about 0.1 to 200 atmospheres.

8. A process according to claim 7 in which the reaction is carried out at a temperature in the range of about −25° C. to 30° C. and at a pressure in the range of about 1 atmosphere to 10 atmospheres.

9. A process according to claim 7 in which substantially equimolecular proportions of trifluoroethylene and fluorinated nitrosoalkane are used for the reaction.

10. A process for the preparation of a co-polymer of trifluoroethylene and trifluoronitrosomethane comprising reacting together substantially equimolecular proportions of trifluoroethylene and trifluoronitrosomethane at a temperature in the range of about −25° C. to 30° C. and at a pressure in the range of about 1 to 10 atmospheres for a length of time such that the blue colour of the reaction solution substantially disappears.

References Cited by the Examiner

FOREIGN PATENTS 1,159,935    2/58    France.

OTHER REFERENCES

Barr et al.: Nature, vol. 175, pages 991–2 (1955).
Barr et al.: Journal of the Chemical Society, pages 1881–1889 (1955).

JOSEPH L. SCHOFER, *Primary Examiner.*

HAROLD N. BURSTEIN, WILLIAM H. SHORT, *Examiners.*